United States Patent
Faragher et al.

(10) Patent No.: US 9,568,587 B2
(45) Date of Patent: Feb. 14, 2017

(54) TRACKING ALGORITHM

(75) Inventors: Ramsey Michael Faragher, Cambridge (GB); Giuseppe Carlos Sarno, Chelmsford (GB)

(73) Assignee: BAE SYSTEMS plc, London (GB)

( * ) Notice: Subject to any disclaimer, the term of this patent is extended or adjusted under 35 U.S.C. 154(b) by 504 days.

(21) Appl. No.: 14/127,009

(22) PCT Filed: Jun. 19, 2012

(86) PCT No.: PCT/GB2012/051402
§ 371 (c)(1),
(2), (4) Date: Dec. 17, 2013

(87) PCT Pub. No.: WO2012/175944
PCT Pub. Date: Dec. 27, 2012

(65) Prior Publication Data
US 2014/0139375 A1    May 22, 2014

(30) Foreign Application Priority Data

Jun. 21, 2011 (EP) ..................................... 11275099
Jun. 21, 2011 (GB) .................................. 1110466.8

(51) Int. Cl.
*G01S 3/02* (2006.01)
*H04W 24/00* (2009.01)
*G01S 5/02* (2010.01)

(52) U.S. Cl.
CPC ............ *G01S 5/0294* (2013.01); *G01S 5/0252* (2013.01)

(58) Field of Classification Search
USPC .... 342/357.21, 357.25, 451, 457; 455/456.1, 455/456.6
See application file for complete search history.

(56) References Cited

U.S. PATENT DOCUMENTS 8,688,375 B2 *  4/2014  Funk .................... G01C 21/165
                                                   340/995.19
2008/0285805 A1   11/2008  Luinge et al.
(Continued)

FOREIGN PATENT DOCUMENTS

EP            1 484 014 A1     12/2004
WO    WO 2010/106530 A2      9/2010
(Continued)

OTHER PUBLICATIONS

International Search Report and Written Opinion dated Nov. 7, 2013 issued in PCT/GB2012/051402.
(Continued)

*Primary Examiner* — Dao Phan
(74) *Attorney, Agent, or Firm* — Scully, Scott, Murphy & Presser, PC

(57) ABSTRACT

A method of tracking an entity by monitoring a signal, the signal tending to vary spatially and be generally time-invariant, the entity moving from a first location within an area to a second location within the area, the method being suitable for use when the location of the source of the signal is unknown, the method comprising providing a plurality of particles for use with a particle filter, each particle being associated with a first particle location, a first particle location being an estimate of the first location of the entity, providing an estimate of the motion of the entity between the first location and the second location, using the estimate of the motion and using the particle filter, for each particle, updating the first particle location for that particle thereby producing an updated particle location, the updated particle location being an estimate of the second location of the entity, for each updated particle, estimating at least one expected signal parameter at the updated particle location, measuring a signal parameter at the second location of the entity, assigning a weight to each updated particle depending (Continued)

on the expected signal parameter estimated for that particle and the measured signal parameter, estimating the second location of the entity by determining a function of the weighted updated particles, and inputting the estimated location and measured signal parameter, as a location/parameter data set, to a database.

16 Claims, 6 Drawing Sheets

(56) References Cited

U.S. PATENT DOCUMENTS

| | | |
|---|---|---|
| 2010/0134276 A1 | 6/2010 | Zaruba et al. |
| 2011/0092222 A1 | 4/2011 | Kuo et al. |

FOREIGN PATENT DOCUMENTS

| | | |
|---|---|---|
| WO | WO 2011/055718 A1 | 5/2011 |
| WO | WO 2011/088411 A2 | 7/2011 |
| WO | WO 2011/103682 A1 | 9/2011 |

OTHER PUBLICATIONS

Extended European Search Report dated Oct. 28, 2011 issued in GB11275099.7.
UK Search Report dated Oct. 12, 2011 issued in GB1110466.8.
International Preliminary Report on Patentability together with the Written Opinion of the International Searching Authority from related International Application No. PCT/GB2012/051402, dated Jan. 9, 2014.
Eliazar, Austin et al., "DP-SLAM: Fast, Robust Simultaneous Localization and Mapping Without Predetermined Landmarks", International Joint Conference on Artificial Intelligence 2003.
Foxlin, Eric, "Pedestrian Tracking with Shoe-Mounted Inertial Sensors", IEEE Computer Graphics and Applications (Nov./Dec. 2005), pp. 38-46.
Park, Sang Kyeong et al., "Zero velocity detection for inertial sensor-based personal navigation systems", SICE Annual Conference 2010 (Aug. 18-21, 2010), pp. 1755-1758.
Ferris, Brian et al., "WiFi-SLAM Using Gaussian Process Latent Variable Models", Proc. of the International Joint Conference on Artificial Intelligence (IJCAI), 2007.
Huang, Joseph; "Efficient, Generalized Indoor WiFi GraphSLAM"; 2011 IEEE International Conference on Robotics and Automation; Received Sep. 13, 2010, pp. 1-6.

* cited by examiner

TRACKING ALGORITHM

FIELD OF THE INVENTION

The present invention relates to the tracking of an entity within an area.

BACKGROUND

An entity may be tracked, i.e. its position at a certain point in time may be estimated or determined, based on an entity's measurement of a given signal metric at locations that the entity visits.

In open outdoor environments, tracking is typically performed by measuring timing or carrier phase measurements. A position of the entity may then be estimated using simple propagation models and databases of transmitter sources.

However, in complex environments, such as indoors or other cluttered regions, these simple propagation calculations tend to fail. Conventional radio positioning methods tend to rely on a radio signal environment being smooth and easily modelled with simple mathematics. In cluttered and indoor regions, signal variations tend to be too complex for traditional radio positioning methods to function satisfactorily.

In a separate field to radio positioning methods, Simultaneous Localization and Mapping (SLAM) is a process by which one or more entities (typically robots or autonomous vehicles) can build a map of an unknown area and, at the same time, determine their current location within that map.

Distributed Particle Simultaneous Localisation and Mapping (DP-SLAM), such as that described in "*DP-SLAM: Fast, robust simultaneous localization and mapping without predetermined landmarks*", A. Eliazar, R. Parr, International Joint Conference on Artificial Intelligence 2003, provides simultaneous localization and mapping without landmarks.

SUMMARY OF THE INVENTION

In a first aspect, the present invention provides a method of tracking an entity by monitoring at least one parameter of at least one signal, the signal tending to vary spatially and be generally time-invariant, the entity moving from a first location within an area to a second location within the area, the method being suitable for use when the location of the source of the signal is unknown, the method comprising providing a plurality of particles for use with a particle filter, each particle being associated with a first particle location, a first particle location being an estimate of the first location of the entity, providing an estimate of the motion of the entity between the first location and the second location, using the estimate of the motion and using the particle filter, for each particle, updating the first particle location for that particle thereby producing an updated particle location, the updated particle location being an estimate of the second location of the entity, for each updated particle, estimating at least one expected signal parameter at the updated particle location, measuring a signal parameter at the second location of the entity, assigning a weight to each updated particle depending on the expected signal parameter estimated for that particle and the measured signal parameter, estimating the second location of the entity by determining a function of the weighted updated particles, and inputting the estimated location and measured signal parameter, as a location/parameter data set, to a database.

The method may comprise monitoring a first radio signal having a first frequency wherein at least one signal parameter is the signal strength of the first radio signal. As such the entity may be tracked by monitoring the signal strength of a radio signal at a first frequency such that the method comprises for each updated particle, estimating an expected radio signal strength at the first frequency at the updated particle location, measuring a radio signal strength at the first frequency at the second location of the entity, and assigning a weight to each updated particle depending on the expected radio signal strength at the first frequency estimated for that particle and the measured radio signal strength at the first frequency.

The method may comprise monitoring a second radio signal, the second radio signal having a second frequency distinct from the first frequency, and wherein at least one signal parameter is the signal strength of the second radio signal. As such, the entity may be tracked by additionally monitoring the signal strength of the radio signal at a second frequency such that the method further comprises for each updated particle, estimating an expected radio signal strength at the second frequency at the updated particle location, measuring a radio signal strength at the second frequency at the second location of the entity, and assigning a weight to each updated particle depending on the expected radio signal strength at the second frequency estimated for that particle and the measured radio signal strength at the second frequency.

The method may comprise monitoring the local magnetic field and wherein at least one signal parameter is the magnetic field strength.

The method may comprise monitoring the local magnetic field and wherein at least one signal parameter is the vector of the magnetic field.

As such, the entity may be tracked by monitoring, exclusively or in combination with the radio field strength(s), the magnetic field signal. Thus the method may further comprise for each updated particle, estimating an expected magnetic field strength and/or vector at the updated particle location, measuring a magnetic field strength and/or vector at the second location of the entity, and assigning a weight to each updated particle depending on the expected magnetic field strength and/or vector estimated for that particle and the measured magnetic field strength and/or vector.

Accordingly each location/signal data set for the database may comprise information relating to the estimated location in addition to any combination or permutation of the radio strength, magnetic field strength, or magnetic vector information for the associated location.

The step of providing an estimate of the motion of the entity between the previous location and the current location may comprise implementing a zero-velocity update or ZUPT process.

The entity may have mounted or coupled to it, or the entity may comprise, an inertial measurement unit. The step of providing an estimate of the motion of the entity between the previous location and the current location may be performed using data from the inertial measurement unit.

The method may further comprise estimating one or more biases of the inertial measurement unit. The step of, for each particle, updating the particle location for that particle may be performed using the estimate of one or more biases of the inertial measurement unit.

The step of estimating one or more biases of the inertial measurement unit may be performed using a Kalman filter.

The method may further comprise, using the estimated second location of the entity, updating the estimates of the one or more biases of the inertial measurement unit.

The step of, for each updated particle, estimating an expected signal parameter at the updated particle location may comprise using the previously collected location/parameter data sets, each data set relating a location to a known signal parameter.

The estimation of the expected signal strength at the updated particle location may comprise implementing a Gaussian Process method given previously collected location/parameter data sets as recorded in the database.

The method may further comprise, using a global positioning system, measuring the second location of the entity. The step of assigning a weight to each updated particle may be performed depending on the measured second location of the entity. Use of a GNSS system (such as GPS) within the method, should a GNSS signal become available, tends to aid with the calibration of inertial measurement unit biases and to provide location estimates.

The method may comprise implementing a Distributed Particle Simultaneous Localisation and Mapping algorithm.

The area in which the entity moves may be an indoor or cluttered environment.

In a second aspect, the present invention provides a method of generating a signal parameter map of an area, the method comprising an entity moving within the area, performing at least one iteration of a method according to the first aspect of the invention, thereby producing at least one measured signal parameter and an estimated location of the entity corresponding to each of the at least one measured signal parameter, and using the each measured signal parameter and each corresponding estimated location of the entity, determining a signal parameter map of the area.

In a third aspect, the present invention provides a method of determining an estimation of a location within an area of a further entity, the method comprising measuring a signal parameter at the location of the further entity, and using a signal parameter map of the area and the measured signal parameter at the location of the further entity, estimating the location within the area of the further entity; wherein the signal parameter map of the area is generated using a method according to the second aspect of the invention.

In a further aspect, the present invention provides apparatus for tracking an entity, the entity moving from a previous location within an area to a current location within the area, the apparatus comprising a motion estimation unit, a particle filter, a radio scanner, a magnetometer device, and one or more processors, wherein the motion estimation unit is arranged to provide an estimate of the motion of the entity between the previous location and the current location, the particle filter comprises a plurality of particles, each particle is associated to a particle location, the particle filter is arranged to, using the estimate of the motion, for each particle, update the particle location for that particle from a previous particle location to an updated particle location, the previous particle location is an estimate of the previous location of the entity, the updated particle location is an estimate of the current location of the entity, the radio scanner is arranged to measure a radio signal strength at the current location of the entity, the magnetometer device is arranged to measure a magnetic field parameter at the current location of the entity; and the one or more processors are arranged to, for each updated particle, estimate an expected radio signal strength at the updated particle location, and estimate an expected magnetic field parameter at the updated particle location, assign a weight to each updated particle depending on the expected radio signal strength estimated for that particle and the measured radio signal strength, and depending on the expected magnetic field parameter estimated for that particle and the measured magnetic field parameter, and estimate the current location of the entity by determining a function of the weighted updated particles.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
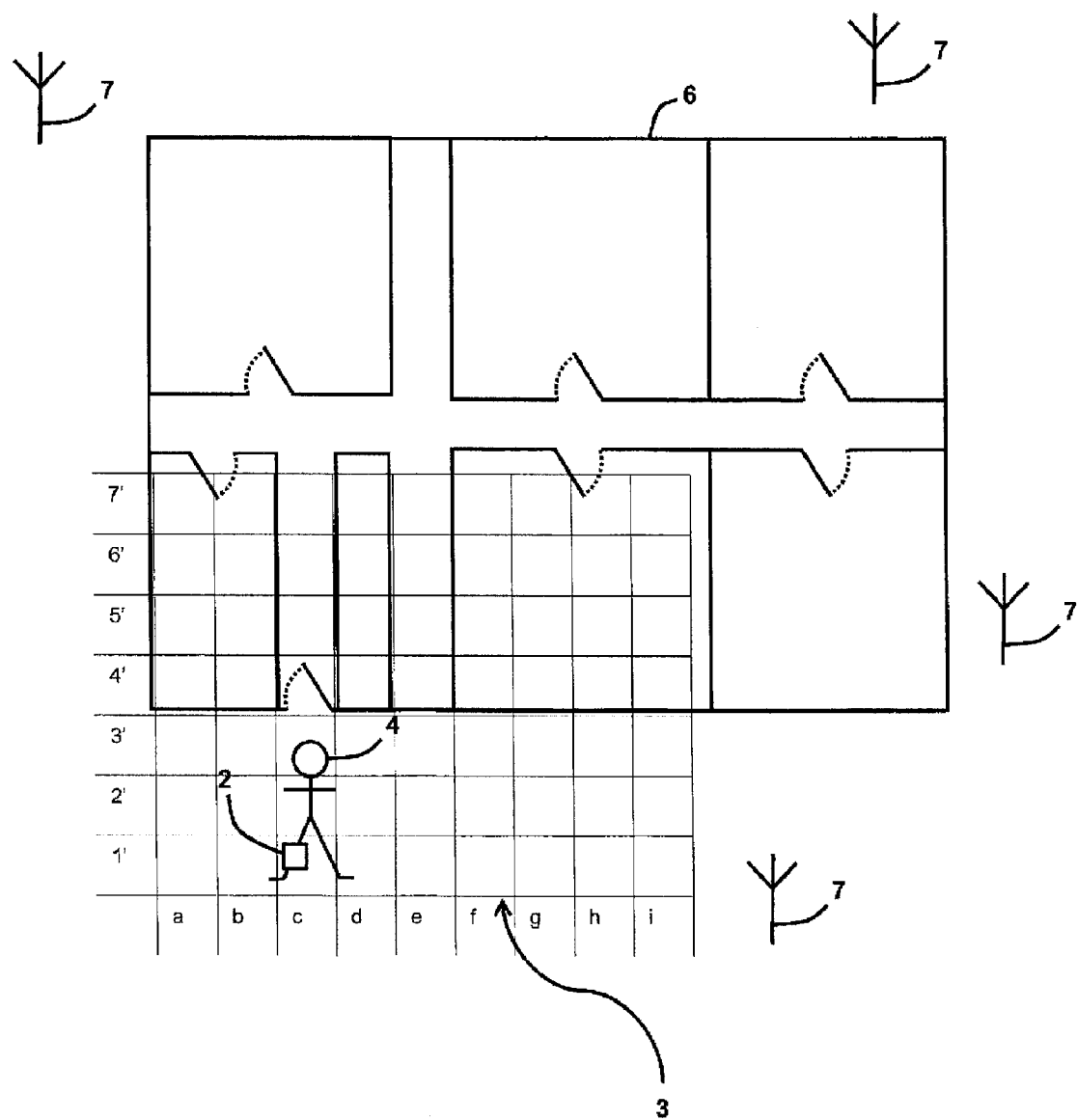
FIG. 1 is a schematic illustration (not to scale) of a scenario in which an embodiment of a tracking device, mounted on a user, is used to generate a radio signal strength map of an area.

FIG. 1 is a schematic illustration (not to scale) of a scenario in which an embodiment of a tracking device 2, mounted on a human user 4, is used to generate a radio signal strength map of an area 6.

The terminology "radio signal strength map of an area" is used herein to refer to a map which provides, for a given point on the map, a magnitude of an electromagnetic field at that point. In this embodiment, a map may be provided in any appropriate way, e.g. pictorially or in data form. A radio signal from which a map is generated may be any appropriate signal or combination of signals, for example, a Wi-Fi™ signal, a Global System for Mobile Communications (GSM) signal, a General Packet Radio Service (GPRS) signal, etc.

In this scenario, the tracking device 2 is mounted on a shoe of the user 4.

The tracking device is described in more detail later below with reference to FIG. 2.

In this scenario, the area 6 is an area inside a building, for example a floor of a house or office. In this embodiment, the area 6 comprises a number of corridors and rooms. The user 4 may walk along the corridors and enter/exit the rooms.

In this scenario, a plurality of radio transmitters 7 is remote from the area 6. Each radio transmitter 7 transmits a radio signal. A radio signal transmitted by a radio transmitter 7 may be within a different frequency range, or have different signal strength to a radio signal transmitted by a different radio transmitter 7.

In this scenario, the radio signals from the radio transmitters produce a relatively complex and highly varied radio signal environment within the area 6. Thus, the strength of a radio signal across a certain frequency range at a particular point within the area 6 is likely to be different to the strength of a radio signal across that range of frequencies at a different point in the area 6.

In this embodiment, the user 4 walks around within the area 6. As the user 4 walks around within the area 6, the tracking device 2 generates a radio signal strength map of an area 6 and in the context of an occupancy grid 3, as described in more detail later below with reference to FIGS. 5 and 6.

Figure 2:
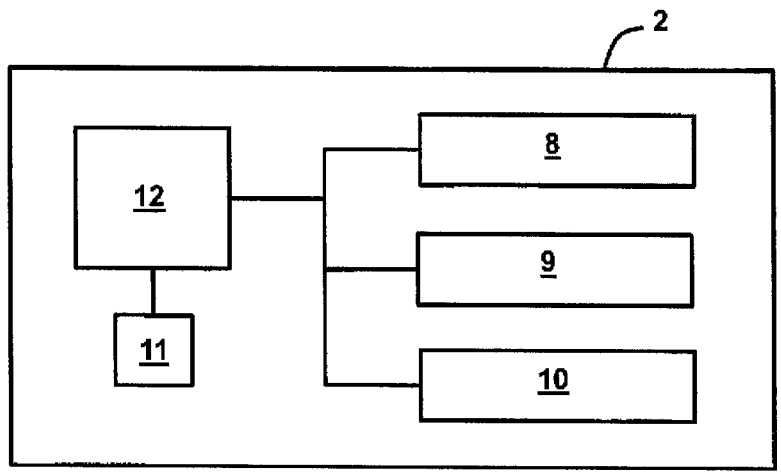
FIG. 2 is a schematic illustration (not to scale) of an embodiment of the tracking device.

FIG. 2 is a schematic illustration (not to scale) of an embodiment of the tracking device 2.

In this embodiment, the tracking device comprises an inertial measurement unit (IMU) 8, a global positioning system (GPS) receiver 9, a radio scanner 10, a memory or database 11, and a processor 12.

In this embodiment, the IMU 8 is connected to the processor 12 such that a signal from the IMU 8 may be sent to the processor 12.

The IMU 8 is described in more detail later below with reference to FIG. 3.

The memory or database 11 is connected to the processor 12.

In this embodiment, the GPS receiver 9 is connected to the processor 12.

In this embodiment, the GPS receiver 9 is a conventional GPS receiver for receiving, from GPS satellites, signals from which the global position of the GPS receiver 9 may be determined. The satellite signals received by the GPS receiver 9 are sent from the GPS receiver 9 to the processor 12.

In this embodiment, the radio scanner 10 is connected to the processor 12.

In this embodiment, the radio scanner 10 is a conventional radio scanner. The radio scanner 10 is arranged to scan across a wide band of radio frequencies and generate a signal indicative of the strength of the radio signal across the frequency band. The signal indicative of the strength of the radio signal across the frequency band is sent from the radio scanner 10 to the processor 12.

For instance, the radio scanner 10 may scan a plurality of predetermined frequency bands and for each predetermined frequency band determine the signal strength. The predetermined frequency bands may be selected to correspond to the frequency bands at which likely radio signal sources may operate (e.g. the scanner may scan the 2.4, 3.6 and 5 GHz ranges associated with Wi-Fi™ standards, and/or may scan the 900 MHz and 1800 MHz bands associated with GSM standards).

Thus the system exploits signals which are assumed to be broadcast from static transmitters at fixed power, the signals thereby can vary with space but should not vary over time. Ideally the sources should not vary in position or output power and such is the case for the majority of public broadcast radio transmissions such as television, public radio, cellular downlinks and WiFi™ routers.

In this embodiment, the processor 12 is arranged to receive signals from each of the IMU 8, the GPS receiver 9, the database 11, and the radio scanner 10. The processor 12 processes those signals, as described in more detail later below with reference to FIGS. 5 and 6, to determine a radio signal strength map of an area 6.

The processor is described in more detail later below with reference to FIG. 4.

Figure 3:
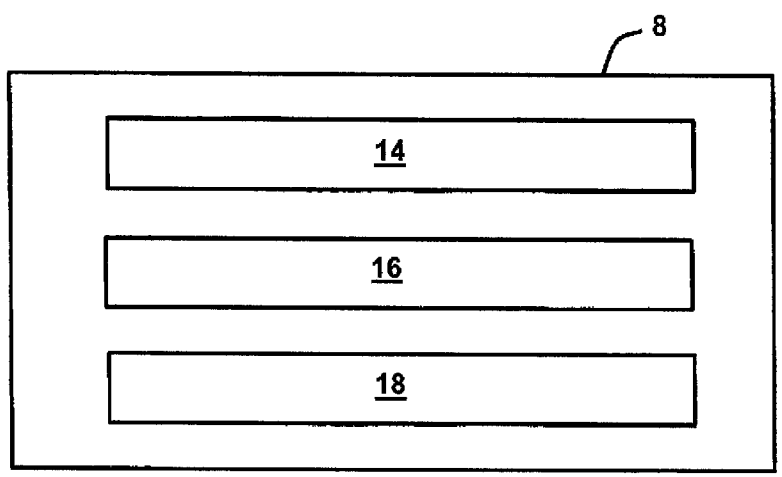
FIG. 3 is a schematic illustration (not to scale) of an inertial measurement unit.

FIG. 3 is a schematic illustration (not to scale) of the IMU 8.

In this embodiment the IMU 8 comprises a gyrometer 14, an accelerometer 16, and a magnetometer 18.

In this embodiment, the gyrometer 14 is a conventional 3-axis gyrometer. Also, the accelerometer 16 is a conventional 3-axis accelerometer. Also, the magnetometer 18 is a conventional 3-axis magnetometer.

In this embodiment, the IMU 8 is used to estimate the motion of the user 4 within the area 6 (i.e. the changes in the positions and headings of the user 4 as the user 4 moves within the area 6).

In this embodiment, the IMU 8 is used to perform a conventional "zero-velocity update" or "ZUPT" method to estimate the motion of the user 4. Further information about ZUPT methods used in this embodiment can be found in *"Pedestrian Tracking with Shoe-Mounted Inertial Sensors"*, E. Foxlin, IEEE Computer Graphics and Applications, pp. 38-46, November/December, 2005 and *"Zero velocity detection for inertial sensor-based personal navigation systems"*, Sang Kyeong Park, Young Soo Suh, Hee Jun Kang, Young Snick Ro, SICE Annual Conference 2010, pp. 1755-1758, 18-21 Aug. 2010, which are incorporated herein by reference.

In other embodiments, the IMU could alternatively be mounted on the waist of the user and be used to provide user movement estimates by counting stepping events with the accelerometer measurements and providing a heading estimate using the compass and gyroscope.

Such a ZUPT method can typically estimate the motion of the user with errors of around 2-3% of the distance travelled. In this embodiment, the use of a ZUPT method is permitted due to the tracking device 2 being mounted on the shoe of the user 4.

In this embodiment, the accelerometer 16 is used to detect a stepping motion of the user 4 (e.g. as performed by a standard pedometer) as the user 4 moves around the area 6.

Also, the magnetometer 18 is used to determine a compass direction for the motion of the user 4, i.e. the user's heading, as the user 4 moves around the area 6.

In this embodiment, the gyroscope 14 facilitates this determination of the direction of the motion of the user 4. Gyroscope measurements are used when magnetometer measurements are unreliable, for example, when perturbations in the magnetometer measurements are caused by electronic interference or proximity to ferrous structures. In this embodiment, the magnetometer measurements are filtered using the gyroscope measurements.

When the magnetometer 18 is performing as intended, changes in the direction of the user 4 as determined using the magnetometer measurements will tend to agree with measurements made using the gyroscope 14.

The reliability of the magnetometer for compass measurements can be assessed by firstly calculating the magnetic inclination and vector magnitude, and secondly comparing these calculated values to the expected measurements of these parameters at the approximate location on Earth of the user. A heading change provided by the compass can also be compared to the gyroscope. If all parameters have an assessed reliability within an acceptable tolerance, then the compass estimate is considered reliable, else the gyroscope output is used to provide the heading until the compass output is back within the acceptable tolerance range.

However, when the magnetometer measurements are being perturbed, the magnetometer measurements will tend not to agree with those of the gyroscope 14. In such instances, the gyroscope 14 alone is used to determine estimates of changes to the user's direction, until the magnetometer rate and gyroscope rate measurements are in agreement. Thus, short-term sporadic magnetometer errors can advantageously be filtered out and ignored.

In this embodiment, measurements taken by each of the gyrometer 14, the accelerometer 16, and the magnetometer 18 suffer biases and bias drifts. These tend to cause an error between the estimate of the user's position and heading and the actual user's position and heading to increase as the distance the user 4 travels increases.

In this embodiment, measurements taken by the GPS receiver 9 and radio scanner 10 are used to constrain these drifts, as described in more detail below with reference to FIGS. 5 and 6.

Figure 4:
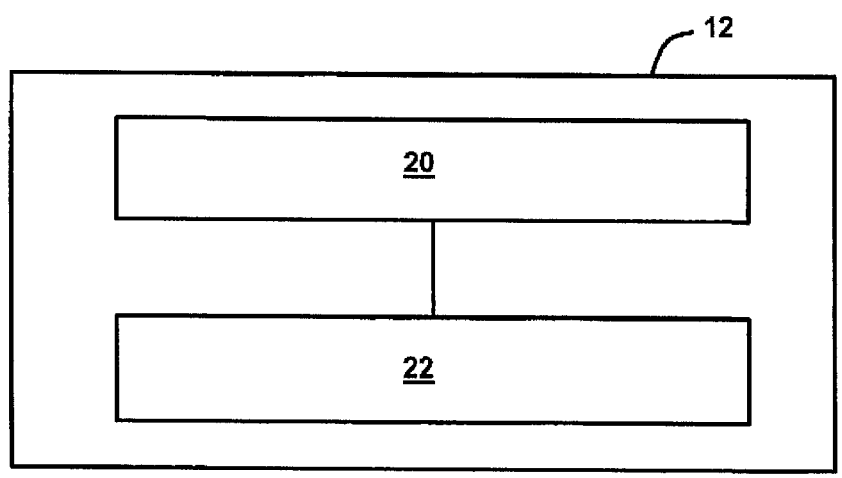
FIG. 4 is a schematic illustration (not to scale) of a processor.

FIG. 4 is a schematic illustration (not to scale) of the processor 12.

In this embodiment, the processor 12 comprises a particle filter 20 and a Kalman Filter 22.

In this embodiment, the particle filter 20 is connected to the Kalman filter 22 such that a signal may be sent from the particle filter 20 to the Kalman filter 22 and vice versa.

In this embodiment, the particle filter 20 is a conventional particle filter.

In this embodiment, the particle filter 20 is used to track an estimate of the position of the user 4 within the area 6 in a conventional way.

In this embodiment, a set of 1000 particles is used. In general the required number of particles is determined by the performance of the inertial measurement unit. Each particle represents an estimate of a position of the user 4. These position estimates for the user 4 may be determined, for example, using any appropriate hypothesis or hypotheses for possible locations of the user 4 at a particular point in time, and any appropriate shape for the probability density function representing the user's position.

In this embodiment, the Kalman filter 22 is a conventional error-state Kalman filter.

In this embodiment, the Kalman filter 22 is used to track biases of the IMU 8 (i.e. compass offset, drift, etc.) in a conventional way. The biases of the IMU 8 are represented by a linear prediction model.

The use of the particle filter 20 to track an estimate of the position of the user 4 within the area 6 tends to provide a more accurate estimate than using the Kalman filter 22 to provide that estimate.

Tracking the relatively simpler states (the biases of the IMU 8) using the particle filter 20 is possible (this is performed in other embodiments). However, this would tend to provide no increase in accuracy of the estimates of the biases and would tend to require greater computational overhead.

Thus, in this embodiment a dual-filter approach is used and tends to be particularly efficient.

Figure 5:
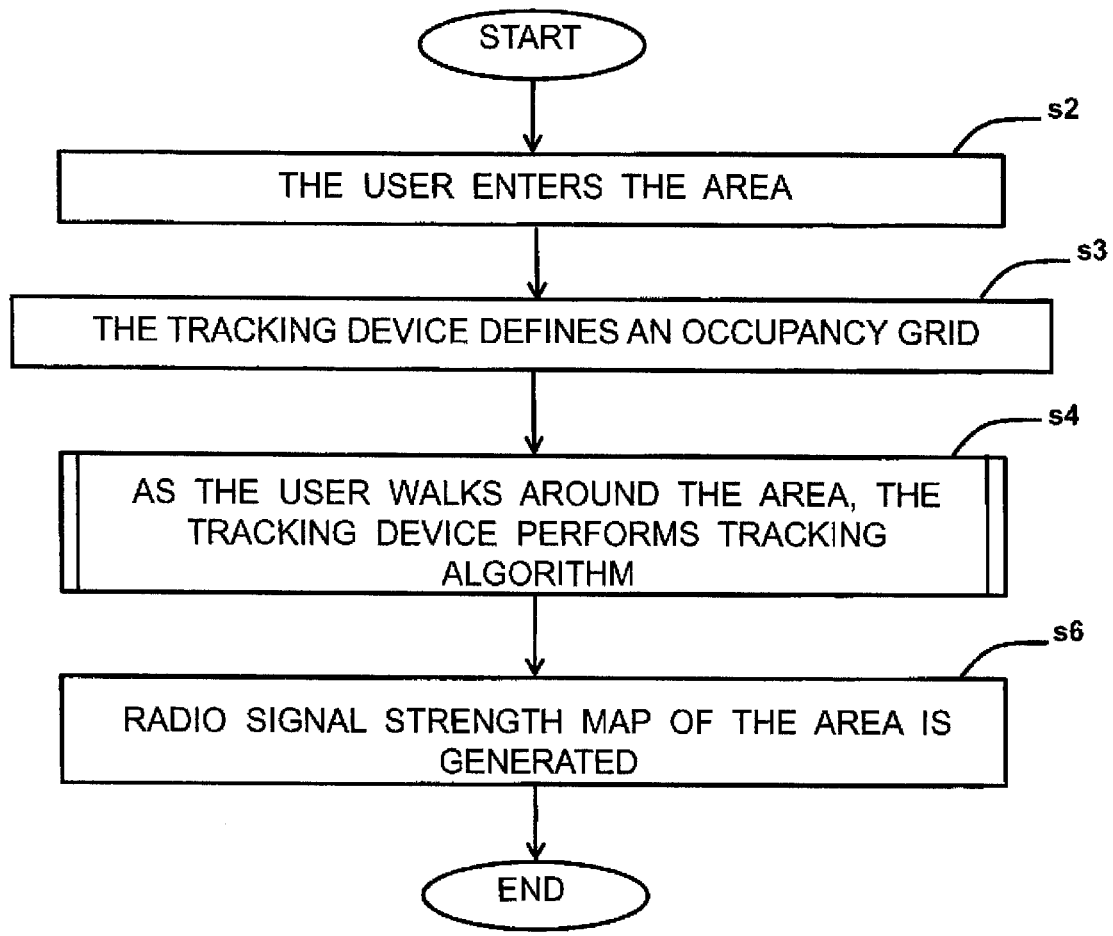
FIG. 5 is a process flow chart showing certain steps of a process by which the above described tracking device is used to generate a radio signal strength map of the area.

FIG. 5 is a process flow chart showing certain steps of a process by which the above described tracking device 2 is used to generate a radio signal strength map of the area 6.

At step s2, the user 4 enters the area 6.

At step s3 the tracking device defines an occupancy grid 3. The occupancy grid 3 is a frame of reference for the tracking algorithm. In this embodiment the occupancy grid 3 is comprised by a grid of square cells (e.g. a1'; i7') each with dimensions 1 m×1 m that are addressed alphabetically along an east-west axis, and numerically along a north-south axis. However, in other circumstances or embodiments the grid could be comprised by other shapes of tessellating cells (e.g. hexagonal, triangular, rectangular) and the dimensions of the tiles may be selected or varied to appropriately balance the processing resource and the track-resolution required. For example, the dimensions may be selected so that the cell size is anywhere between 0.25 m$^2$ and 100 m$^2$, or more particularly between 0.6 m$^2$ and 4 m$^2$.

The occupancy grid 3 acts to quantize the continuous location space and thereby, as the size of the cell increases can reduce the processor calculations employed in estimation of signal intensity and location. Conversely, as the size of the cell decreases, it may be possible to more precisely locate the user.

At step s4, as the user 4 walks around the area 6 the tracking device 2 performs a tracking algorithm.

The tracking algorithm is described in more detail later below with reference to FIG. 6.

In this embodiment, the tracking algorithm comprises predicting a radio signal strength at a plurality of different locations within the area 6.

At step s6, using the radio signal strengths estimated at step s4 and the locations within the area 6 that those signal strengths were estimated for, a radio signal strength map 24 of the area 6 is generated.

Figure 6:
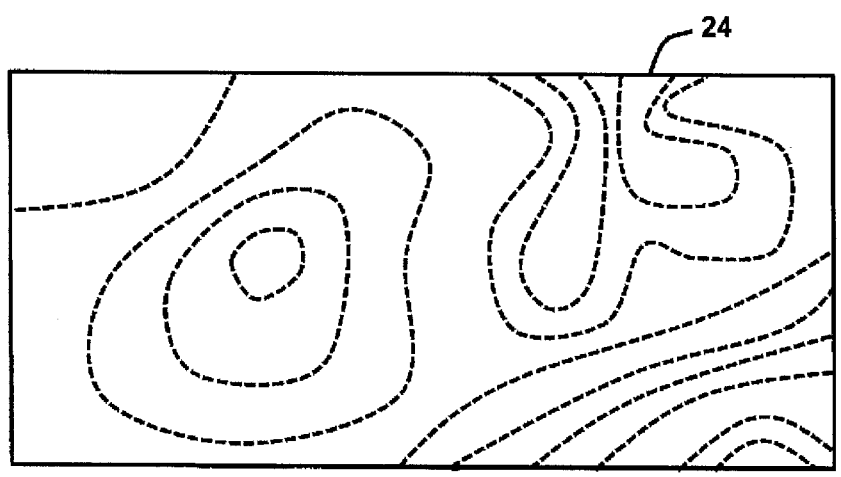
FIG. 6 is a schematic illustration (not to scale) of a radio signal strength map of the area generated in this embodiment.

FIG. 6 is a schematic illustration (not to scale) of a radio signal strength map 24 of the area 6 generated in this embodiment. The radio signal strength map 24 is depicted in FIG. 6 as a contour map. A contour (i.e. a line along which the radio signal strength is substantially equal) is indicated in FIG. 6 by a dotted line.

Thus, a process of generating a radio signal strength map 24 of the area 6 is provided.

Figure 7:
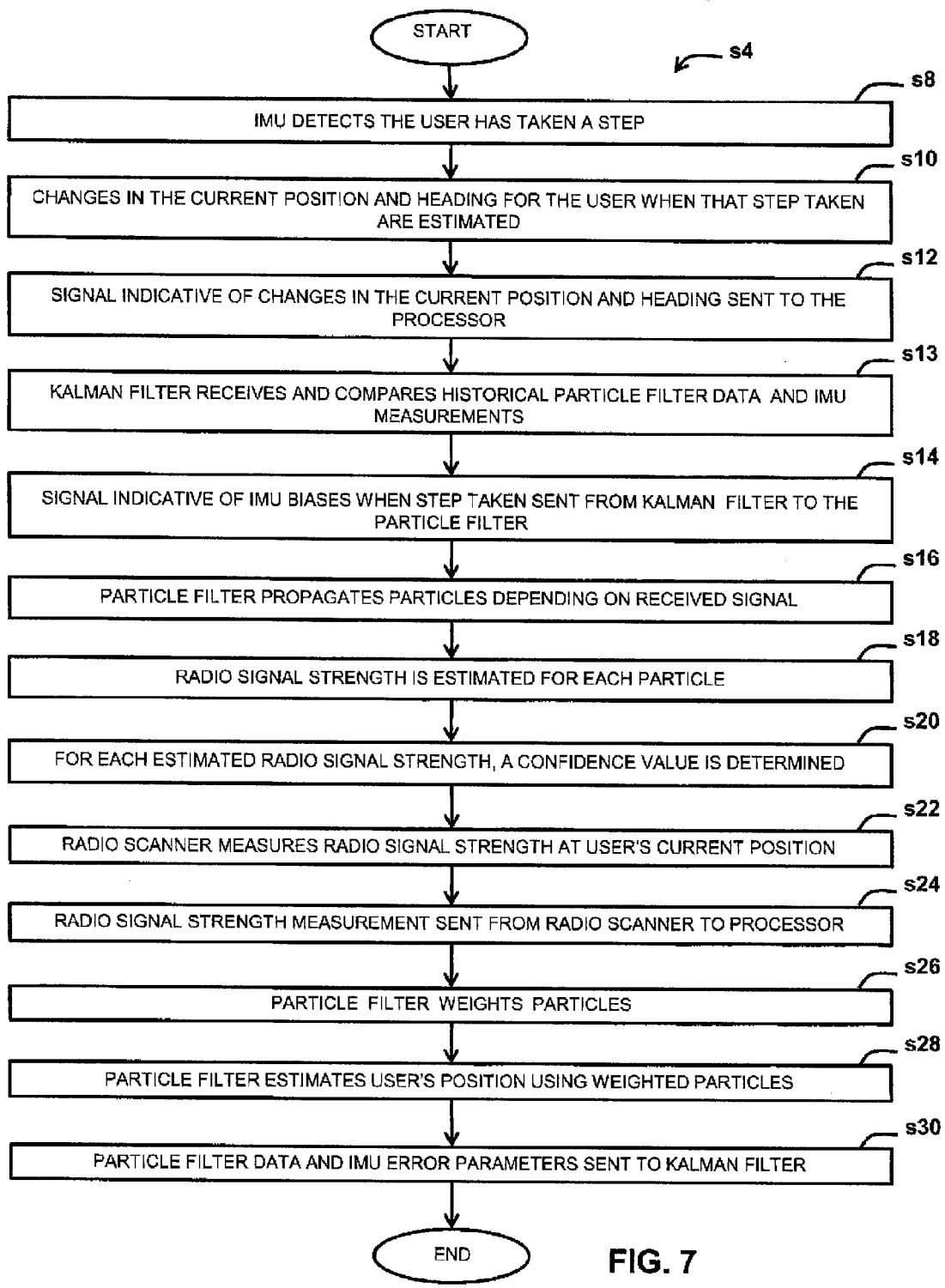
FIG. 7 is a process flow chart showing certain steps of a tracking process as performed by the tracking device at step s4 of the process of FIG. 5.

FIG. 7 is a process flow chart showing certain steps of a tracking process as performed by the tracking device 2 at step s4 of the process of FIG. 5.

Although the tracking process described below with reference to FIG. 7 is for convenience and ease of understanding described as being performed for a single step of the user 4, in operation, the process of FIG. 7 is performed for each step the user 4 takes as they walk around the area 6.

In other words, in this embodiment, at step s4 of the process of FIG. 5, the process of FIG. 7 is repeated for each step the user takes.

As described in more detail later below, estimations of the user's position and of the radio signal strength at locations within the area 6 are updated with each step the user takes (and with each of the measurements made by the radio scanner 10 and GPS receiver 9).

In this embodiment, the tracking process of FIG. 7 uses a Distributed Particle Simultaneous Localisation and Mapping (DP-SLAM) process to track the position of the user 4. Further information about DP-SLAM may be found in "*DP-SLAM: Fast, robust simultaneous localization and mapping without predetermined landmarks*", A. Eliazar, R. Parr, International Joint Conference on Artificial Intelligence 2003, which is incorporated herein by reference.

At step s8, using a conventional ZUPT method, the IMU 8 detects that the user 4 has taken a step (hereinafter referred to as the "current step" which can be thought of as a step which moves the user from a first position to a second position).

At step s10, using a conventional ZUPT method, the IMU 8 measures accelerations and rotations experienced as the user 4 takes the current step. Also, the IMU 8 measures the local magnetic field when the user 4 takes the current step.

These measurements are used to estimate changes in position and heading of the user 4 between a previous step and the current step.

In other words, the IMU 8 measures an absolute heading for the user 4 using measurements of the magnetometer 18 and accelerometer 16. In this embodiment, this heading is measured when the user 4 is static.

As described above, the gyrometer 14 is used to filter the absolute measurements of the heading of the user 4.

Also, the IMU 8 measures linear accelerations and angular velocities experienced between the current step and a previous step.

In this embodiment, the measured linear accelerations and angular velocities are integrated over time to provide estimates of changes in the position and heading of the user 4 between a previous step and the current step. In this embodiment, this is performed externally from the IMU 8, e.g. in an additional further processor (not shown in the Figures).

At step s12, a signal indicative of the change in position and heading of the user 4, and of the absolute heading of the user 4, as estimated at step s10, is sent to the particle filter 20 of the processor 12.

At step s13, the Kalman filter 22 receives historical data from the particle filter 20 and current IMU measurements/settings from the IMU 8.

In this embodiment, the received historical particle filter data and IMU measurements are compared by the Kalman filter 22 to perform long-term filtering as part of a feedback system (this feedback loop is completed at step s30 which is described in more detail later below).

This comparison of the historical particle filter data and IMU measurements is performed to produce an estimate of the current biases of the IMU 8.

In this embodiment, the bias of the compass (provided by the magnetometer 18 and accelerometer 16) is tracked by the Kalman filter 22. Other biases such as a step length of the user 4, a gravity vector and systematic offsets in the sensor axes may also be monitored/tracked.

At step s14, the Kalman filter 22 sends a signal to the particle filter 20 of the processor 12. This signal is indicative of the Kalman filter's estimate of the biases of the IMU 8 when the step was taken by the user 4 (as determined at step s13 above).

In other words, the estimates of the current IMU biases are sent from the Kalman filter 22 to the particle filter 20.

In other embodiments, the biases tracked by the Kalman filter could instead be tracked by the particle filter, but to do so would incur an increase in the number of particles needing to be maintained to successful track all states. Thus the present embodiment tends to reduce the number of particles required.

At step s16, using a conventional particle filtering method, the particle filter 20 propagates a previous particle set (i.e. a previous set of estimations of the user's position within the area 6) in a direction of travel specified by the signals received at the particle filter 20.

In other words, a previous set of particles (estimations of the user's position) is updated using the estimation of the change in position and heading of the user 4 between the previous step and the current step (estimated at step s10 and sent to the particle filter 20 at step s12) and the estimation of the current IMU biases (estimated and sent to the particle filter 20 at step s14).

Thus, a current set of particles is determined.

At step s18, for each particle in the current set of particles, the particle filter 20 predicts a strength of the radio signal at the position represented by that particle.

The prediction of a signal strength at a particular location may be implemented using a process of interpolation or regression from known measurements (if necessitated, other mathematical methods, such as extrapolation or imputation could be used). Such known measurements, in the form of location/signal data sets, may be read from the memory/database 11 where they have been stored.

In this embodiment, a method in which Gaussian Processes are implemented is used to predict a radio signal strength at a position represented by a particle. However, in other embodiments a different method may be used. For example a method in which a signal strength propagation model, or an Inverse Distance Weighting (IDW) process, is implemented may be used.

In this embodiment, a Gaussian Process defined by a mean and variance, defines the statistics of the signal strength measurements at arbitrary locations given some training data (locations and strength measurements or in other words, the location/signal data).

In this embodiment, the mean of the multivariate distribution is the predicted radio signal strength at a given location. Also, the variance of the multivariate distribution is a measure of the confidence of this estimate.

In effect, the Gaussian Process technique "fits" a multivariate (i.e. multidimensional) Gaussian distribution to a set of points.

The smoothness of the distribution is determined by a function defining the signal strengths at the different locations. This function is a "Kernel function". Examples of appropriate kernel functions include the Squared-Exponential function, the Squared Exponential with Automatic Relevance Determination (ARD) function, and the Matern function In this embodiment, the underlying signal strength measurements are assumed to be Gaussian with zero mean and a variance which is expressed as the sum of the measurement variance and the measurement noise variance.

An advantage provided by using a Gaussian Process method is that the mean and variance of the multivariate distribution can be calculated from simple expressions. These are given in terms of the training data (measurements and locations), a desired location, and also the Kernel function.

At step s20, for each prediction of the strength of the radio signal, the particle filter 20 determines a confidence value. As mentioned above, in this embodiment the confidence value for a prediction of the strength of the radio signal is the variance of the multivariate distribution used in the Gaussian Process method.

At step s22, the radio scanner 10 measures the strength of the radio signal when the step was taken.

In other words, the radio scanner 10 measures the radio signal strength at the user's current position.

At step s24, the radio scanner measurement is sent from the radio scanner 10 to the particle filter 20 of the processor 12.

At step s26, the particle filter 20 weights the particles in the current set using the confidence values determined at step s20 and the radio scanner measurement received at step s24.

In this embodiment, the particles of the current set are weighted such that particles corresponding to a predicted radio signal strength that is similar to the radio signal strength observed using the radio scanner 10 are allocated a relatively high weighting. Particles corresponding to a predicted radio signal strength that is dissimilar to the radio signal strength observed using the radio scanner 10 are allocated a relatively low weight or removed. These weightings are determined using a scoring metric based on empirical or theoretical modelling. Examples of such metrics are the Mahalanobis distance or Euclidean distance.

Also, in this embodiment if the user 4 returns to a location within the area 6 which they have been before, the particle cloud will also be near a location it has been in before. In this embodiment, when the user 4 returns to a location previously visited, particles that have radio signal strength measurements that agree with their older measurements are weighted more strongly than other particles.

Also, in this embodiment particles are re-sampled according to their weightings and the particle cloud shrinks to represent the increased confidence in the current location of the user 4.

The user's history (i.e. the path the user 4 has walked as estimated by the tracking device 2) can also be "redrawn" (i.e. re-estimated) using these particle weightings and the individual movement histories of the particles, thereby tracing out a more confident path than before the reweighting.

In this embodiment, if a GPS signal can be received by the GPS receiver 9, these global position measurements and their corresponding confidence are also used to weight the current particle set. Because in this embodiment the area 6 is indoor, a GPS signal may be intermittent or not available.

At step s28, the particle filter 20 determines an estimate of the position of the user 4 within the area 6. This estimated location is combined with the measured, and therefore known, signal strength and sent as a location/signal data set to the database 11 (where such data can be used to build up a map of signal strengths within the occupancy grid and in turn to estimate future locations).

In this embodiment, this estimated location is determined from the weighted mean of the current particles' locations (the weights of the particle being those specified at step s26).

In this embodiment, strongly weighted particles are reproduced and weakly particles are removed such that the particle population is maintained at the maxima of the probability density function representing the location (or possible locations) of the user 4.

At step s30, the position of the user 4 estimated by the particle filter 20 at step s28 and the current error parameters of the IMU 8 are sent to the Kalman Filter 22 from the particle filter 20 and IMU 8 respectively. This completes the feedback loop mentioned above at step s13 of the process of FIG. 7.

The steps of the tracking process of FIG. 7 may be repeated for any number of steps taken by the user. For example, the tracking process may be repeated for a pre-determined number of steps, or may be stopped after a pre-determined time-period has expired.

Thus, a tracking process performed by the tracking device 2 in which radio signal strength estimations for locations within the area 6 are determined is provided.

Figure 8:
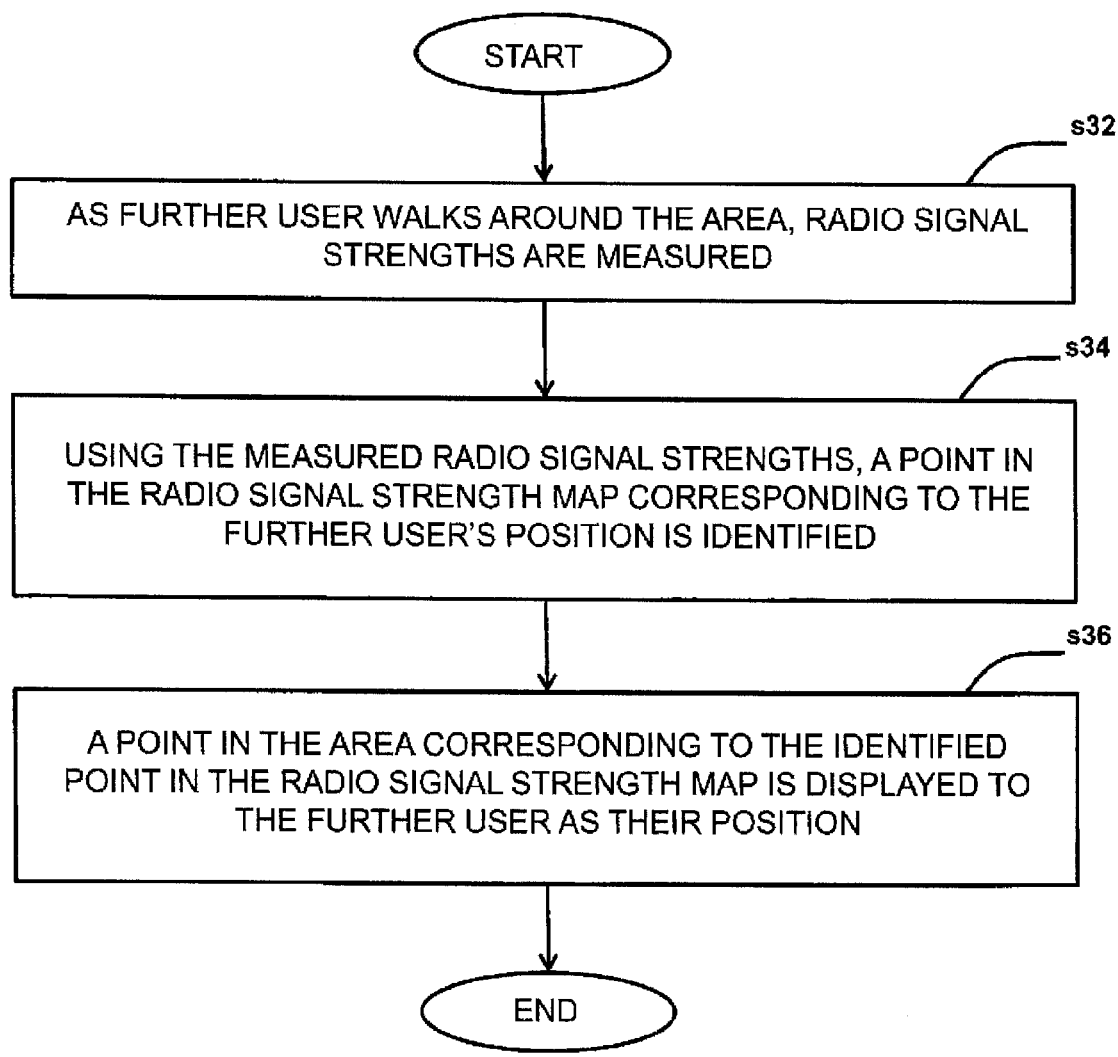
FIG. 8 is a process flow chart showing certain steps of a process by which a further user can determine their location.

FIG. 8 is a process flow chart showing certain steps of a process by which a further user can determine their location within the area using the radio signal strength map 24 generated by the user 4.

At step s32, the further user travels within the area 6. As the further user travels within the area 6, the further user measures, e.g. using a mobile telephone or similar device, the radio signal strength at their locations within the area 6.

At step s34, the radio signal strengths measured at step s32 by the further user are compared (e.g. by the further user's mobile telephone) to the radio signal strength map 24 to identify a point on the radio signal strength map 24 corresponding to the further user's position.

At step s36, a location within the area 6 that corresponds to the identified point on the radio signal strength map 24 is (e.g. by the further user's mobile telephone) displayed to the further user. This displayed location is the user's position within the area 6 as determined/estimated using the measured radio signal strengths and the radio signal strength map 24.

Thus, a process by which the further user can determine their location within the area using the radio signal strength map 24 is provided.

As a result of the above described tracking device and method, the drift on a pedestrian IMU tends to be constrained. This is achieved by implementing a DP-SLAM (distributed particle SLAM) algorithm.

The DPSLAM approach combined with the ZUPTS method (and, if available with a GPS) tends to allow a single user to create a radio signal strength map of an area.

Also, it is not required for the user that generates the map to know where they are at any point during the generation of the map (i.e. the radio signal strength map is generated using "blind" training points or location/signal data).

Furthermore, the tracking device tends to generate the radio signal strength map of the area without requiring an input from the user (i.e. the map is generated in a passive way from the point of view of the user).

In turn, the radio signal strength map generated by the user, tends to allow for indoor navigation to be performed by/for other users, as well as allowing for future indoor navigation by the user who has previously generated the map. These other users may navigate using a radio scanner and the radio signal strength map generated using the above described tracking device.

The above described tracking device tends to be relatively small and lightweight. Thus, motion of the user tends not to be inhibited or restricted by the tracking device being mounted on the shoe of the user.

A further implication of the above described apparatus and method is that, by implementing the ZUPT method to estimate the motion of the user, it tends to be possible to successfully record and take into account lateral and backwards steps performed by the user. Nevertheless, using external radio information as described above tends to provide that if the user moves in a way that is not supported in the IMU motion model, the user's movement is still tracked.

A further implication of the above described system and method is that, in contrast to conventional indoor tracking techniques, inertial measurements are used to provide the motion model, i.e. distance and heading, and bespoke probabilistic models that make assumptions on motion behaviour are not used.

The two-stage navigation filter (i.e. the combination of the particle filter and the Kalman filter) tends to reduce or minimise the computational overhead in location tracking. In particular, a simple, error-state Kalman filter is used to filter the IMU measurement biases only, and a separate particle filter is used to track user location.

A further implication of the above described system and method is that it tends to be possible to track the user in three dimensions (e.g. over different floors of a building). Additional mathematical models tend not to be required to do this. This is in contrast to many conventional methods and systems.

The above described system and method provides a mechanism for gathering training data with tagged relative or absolute co-ordinates. This training data is then used as described above to perform a SLAM method.

The Gaussian Process method performed as described above is flexible. For example, the choice of kernel function provides different ways of controlling the behaviour of the regression performance. This facilitates the Gaussian Process in providing predictions of radio signal strengths in relatively complex signal propagation conditions as experienced within buildings.

The use of probabilistic weightings and particle filtering tends to be particularly effective for maintaining multiple hypotheses (for the location of the user) in ambiguous situations (such as if an opportunistic radio signal strength is not unique at every location within the area).

The use of a SLAM process tends to provide that drift on an IMU may be constrained even if no external aiding information (such as ranging radio measurements, GPS updates or a reference opportunistic radio database) is available.

The DP-SLAM process does not require landmarks to be explicitly identified and located. In particular, a location of the radio signal sources is neither required nor determined during the process. In the above embodiments, a particle cloud (each particle representing a possible location of the user) propagates according to the IMU motion measurements, and grows or shrinks according to a current uncertainty in location. In above embodiments, a navigation space (Latitude and Longitude) may be defined as an occupancy grid 3 with a fixed cell size (e.g. 1 meter squares). As each of the particles moves through a cell in the occupancy, an identity of that particle and a current radio measurement for that particle is recorded for that cell. Since the particle cloud represents samples from the probability distribution of all possible user locations, it is relatively likely that at least one particle will trace out an accurate representation of the true motion of the user (if enough particles are chosen to allow dense enough sampling of the probability space). In such a case, if the user returns to a location they have been to before, the particle which has happened to move in a manner closely representing the user's true path will tend to have very similar radio signal strength measurements stored at that location. In the above embodiments, particles that have radio signal strength measurements that agree with their previous radio signal strength measurements are weighted strongly. Also, particles are re-sampled according to their weightings and the particle cloud shrinks to represent the increased confidence in the current location of the user. The user's history can also be "redrawn" (i.e. updated) using these particle weightings, tracing out a more confident path than before the reweighting.

The above described use of landmark-free SLAM constrains the IMU drifts that occur in between times when user returns to a location they have been to before. Problems caused by overall errors that the system started with (e.g. a compass bias or systematic error on global position estimate) may be alleviated or eliminated by providing that the tracking process is initiated with a well aligned IMU. For example, the tracking process may be initiated in, or shortly after leaving, a GPS-enabled environment, or other region where external aiding is available. The DP-SLAM process tends to extend and maintain the performance of the IMU as long as the user revisits locations within the area during the operation.

A further implication of the above described system and method is that a processing demand placed on the processor may be scaled as desired. For example, by making the occupancy grid "coarser" (e.g. by using 5 meter squares instead of 1 meter squares) the above described algorithm may be performed using a relatively less capable processor.

It is also advantageously possible to vary the size of the squares of the occupancy grid size depending on the complexity of the environment.

Apparatus, including the processor, for implementing the above arrangement, and performing the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIGS. 5, 7 and 8 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In above embodiments, the user is a human user. However, in other embodiments the user is a different type of user, for example a vehicle (e.g. a robot or autonomous vehicle), or an animal.

Also, in above embodiments, the user moves around the area by walking. However, in other embodiments the user moves around the area in a different way appropriate for the type of user.

In above embodiments, the area is inside a building. However, in other embodiments the area is a different type of building, for example, an outdoors urban area. The above described system and method tends to be particularly effective in relatively complex (highly varied) radio environments such as indoors or other cluttered regions. The above described method advantageously exploits the relatively complex variations in the signal strength measurements in such cluttered environments to provide information on the location of the user. This tends to be in contrast to conventional radio positioning methods which typically rely on the signal environment being smooth and easily modelled with simple mathematics (e.g. directly relating a signal flight time with a distance).

In other embodiments, the above described system and method is used in combination with a conventional radio positioning system and method. In such embodiments, in open outdoor environments the conventional radio positioning system may be used to perform tracking by implementing conventional timing and carrier-phase based positioning, whilst in cluttered and indoor regions (where the signal variations are too complex for conventional radio positioning methods to function satisfactorily), the above described system and method is employed instead.

In above embodiments, there is a plurality of radio transmitters. Also, each radio transmitter is remote from the area. However, in other embodiments there is only a single radio transmitter. Also, in other embodiments, any number of the radio transmitters may be inside the area.

In above embodiments, the tracking device measures the intensity of a radio signal as a parameter to assist in tracking the device and in mapping that parameter. However the tracking device may measure other spatially varying, time-invariant (e.g. static for at least the duration of the tracking exercise) parameters to assist with tracking. Other such parameters would include magnetic field strength and/or vector (particularly where there are disturbances in the magnetic field as a result of local ferrous entities), sound, ambient light, or gravitational fields (especially where the user's position may vary vertically e.g. may be on one of many storeys of a building). Further, in other embodiments the tracking device may monitor any combination of these parameters to inform of location.

Where the tracking device measures the magnetic field strength, the device should be provided with a magnetometer and where the tracking device measures the magnetic vector a plurality of magnetometers could be arranged to form a gradiometer. Such a tracking device may make use of devices already provided within the IMU 8.

In above embodiments, the tracking device is used to generate a radio signal strength map of the area. This signal strength map is for use by one or more further users/entities. These further users/entities may use the map to determine a location for themselves using, for example, cheaper/simpler/lower-processing-power devices than the apparatus used to generate the map, e.g. mobile telephones. These devices may not comprise an inertial measurement unit.

For example, airport staff could use tracking devices for navigation within an airport, which in turn generate maps for use by members of the public, and/or which could be used to track e.g. luggage, trolleys, and the like.

In another example, one or more members of a team (such as a team of fire-fighters or soldiers) may wear a tracking device to generate a map of an area (e.g. a building or combat zone). This map may be used by other members of the team to facilitate navigation within the area, or may be used by other members of the team to locate each other should the need arise (e.g. in the case of an emergency).

In another example, a team of users are relatively positioned, e.g. using body-worn sensors which provide radio-ranging information to each other. The radio devices also survey the radio environment of a building in which the team is operating by gathering radio measurements on as many populated radio bands as possible (e.g. public broadcast bands, cellular bands, etc). As described above, the surveyed data is used to generate maps of the radio environment within the building. These maps can then be employed in subsequent visits into the building to allow any members of the team to have their positions tracked based on instantaneous radio measurements compared with predictions drawn from the survey map. Inertial measurements tend to provide sufficient constraints between radio measurements to provide better than room-level positioning.

However, in other embodiments the tracking device is used for a different purpose. For example, in other embodiments the tracking device is used only to track the user within the area and provide an estimated global position of the user, e.g. for use by a further user.

Also, in other embodiments the generated radio signal strength map may be used in a different way. For example, in other embodiments, the radio signal strength may be used to facilitate navigation by the same user that generated the map, e.g. at a different time to that at which the map was generated.

In above embodiments, there is a single user to which is mounted a single tracking device. However, in other embodiments there are a different number of users, each with any number of tracking devices. In such embodiments, measurements by each of the tracking devices may be combined to generate a single common radio signal strength map of the area.

In above embodiments, the tracking device is mounted on the shoe of the user. However, in other embodiments the tracking device is mounted to the user at a different location. For example, in other embodiments, the tracking device is a hip-mounted tracking device. In such embodiments, if appropriate, the IMU of the tracking device may be a different type of IMU, for example a low-cost Inertial Navigation System that uses a consumer-grade Micro-Electro-Mechanical (MEMS) sensor to detect pedestrian motion.

Also, in other embodiments an IMU may not comprise a gyrometer or a magnetometer. Also, an IMU may comprise one or more different types of component instead of or in addition to the gyrometer, the magnetometer, and the accelerometer to provide the above described functionality.

In above embodiments, the tracking device comprises a GPS receiver. However, in other embodiments the tracking device does not comprise a GPS receiver.

In above embodiments, a ZUPT method is performed, e.g. to estimate a position of the user and a heading in which the user is travelling each time a step is taken. However, in other embodiments a different appropriate process is performed to predict a location of the user using IMU measurements.

In above embodiments, a two-stage navigation filter (i.e. the combination of the particle filter and the Kalman filter) is implemented. A Kalman filter is used to filter the IMU measurement biases, and a separate particle filter is used to track user location. However, in other embodiments only a single filter is used. For example, in other embodiments, a particle filter is used to perform both of the aforementioned functions. Also, in other embodiments, a different type of system or processing method may be used to perform the function provided by either, or both, of the Kalman filter and the particle filter.

In above embodiments, Gaussian Processes are implemented to predict a radio signal strength for a particle, i.e. Gaussian Processes are used as a regression algorithm to estimate a radio signal strength for each particle and generate the radio signal strength map. However, in other embodiments a different method may be used. For example a method in which a signal strength propagation model, or an Inverse Distance Weighting (IDW) process, is implemented may be used.

In other embodiments, a variant of the Gaussian Processes model, namely a "Gaussian Processes with latent variables" method may be used. Such a method tends to provide the same functionality as the above described Gaussian Processes model but uses unlabelled signal measurements (i.e. the locations at which these measurements are made is unknown). Further information on Gaussian Processes with latent variables is found in *"Wi-Fi-SLAM Using Gaussian Process Latent Variable Models"*, B. Ferris, D. Fox, D. Hähnel, Proc. of the International Joint Conference on Artificial Intelligence (IJCAI), 2007, which is incorporated herein by reference.

Also, in other embodiments, a different SLAM process may be used as a regression algorithm to estimate a radio signal strength for each particle and generate the radio signal strength map. An example of a different SLAM method is GRAPH-SLAM. Further information about GRAPH-SLAM can be found in *"Efficient, Generalized Indoor WiFi GraphSLAM"*, Joseph Huang, David Millman, Morgan Quigley, David Stavens, Sebastian Thrun and Alok Aggarwal (http://www.cs.stanford.edu/people/dstavens/icra11/huang_etal_icra11.pdf) which is incorporated herein by reference.

The invention claimed is:

1. A method of tracking an entity by monitoring at least one parameter of a signal, the signal tending to vary spatially and be generally time-invariant, the entity moving from a first location within an area to a second location within the area, the method being suitable for use when the location of the source of the signal is unknown, the method comprising:
   providing a plurality of particles for use with a particle filter, each particle being associated with a respective first particle location, each respective first particle location being an estimate of the first location of the entity;
   providing an estimate of the motion of the entity between the first location and the second location based on signals from a motion measurement device;
   using the estimate of the motion and using the particle filter, updating each particle thereby producing an updated respective particle location, each updated respective particle location being an estimate of the second location of the entity;
   for each updated particle, estimating at least one expected signal parameter at the updated respective particle location;
   measuring a signal parameter at the second location of the entity;
   assigning a weight to each updated particle depending on the expected signal parameter estimated for that particle and the measured signal parameter;
   estimating the second location of the entity by determining a function of the weighted updated particles; and
   inputting the estimated location and measured signal parameter, as a location/parameter data set, to a database.

2. A method according to claim 1 comprising monitoring a first radio signal having a first frequency wherein at least one signal parameter is the signal strength of the first radio signal.

3. A method according to claim 2 comprising monitoring a second radio signal, the second radio signal having a second frequency distinct from the first frequency, and wherein at least one signal parameter is the signal strength of the second radio signal.

4. A method according to claim 1 comprising monitoring a local magnetic field and wherein at least one signal parameter is the magnetic field strength.

5. A method according to claim 1 comprising monitoring a local magnetic field and wherein at least one signal parameter is the vector of the magnetic field.

6. A method according to claim 1, wherein the step of providing an estimate of the motion of the entity between the first location and the second location comprises implementing a zero-velocity update or ZUPT process.

7. A method according to claim 1, wherein:
   the motion measurement device is an inertial measurement unit;
   the entity has mounted or coupled to it, or the entity comprises, the inertial measurement unit; and
   the step of providing an estimate of the motion of the entity between the first location and the second location is performed using data from the inertial measurement unit,
   the method further comprising estimating one or more biases of the inertial measurement unit, wherein the step of, updating each particle is performed using the estimate of one or more biases of the inertial measurement unit.

8. A method according to claim 7, wherein the step of estimating one or more biases of the inertial measurement unit is performed using a Kalman filter.

9. A method according to claim 7, the method further comprising, using the estimated second location of the entity, updating the estimates of the one or more biases of the inertial measurement unit.

10. A method according to claim 1, wherein the step of, for each updated particle, estimating an expected signal parameter at the updated respective particle location comprises using previously collected location/signal data sets, each data set relating a location to a known signal parameter.

11. A method according to claim 1 wherein estimating an expected signal parameter at the updated respective particle location comprises implementing a Gaussian Process method given previously collected location/parameter data sets as recorded in the database.

12. A method according to claim 1, the method further comprising, using a global positioning system, measuring the second location of the entity, wherein the step of assigning a weight to each updated particle is performed depending on the measured second location of the entity.

13. A method of tracking an entity by monitoring at least one parameter of a signal, the signal tending to vary spatially and be generally time-invariant, the entity moving from a first location within an area to a second location within the area, the method being suitable for use when the location of the source of the signal is unknown, the method comprising:
   providing a plurality of particles for use with a particle filter, each particle being associated with a respective first particle location, each respective first particle location being an estimate of the first location of the entity;
   providing an estimate of the motion of the entity between the first location and the second location based on signals from a motion measurement device;
   using the estimate of the motion and using the particle filter, updating each particle thereby producing an updated respective particle location, each updated respective particle location being an estimate of the second location of the entity;
   for each updated particle, estimating at least one expected signal parameter at the updated respective particle location;
   measuring a signal parameter at the second location of the entity;
   assigning a weight to each updated particle depending on the expected signal parameter estimated for that particle and the measured signal parameter;
   estimating the second location of the entity by determining a function of the weighted updated particles; and
   inputting the estimated location and measured signal parameter, as a location/parameter data set, to a database, wherein the method comprises implementing a Distributed Particle Simultaneous Localisation and Mapping algorithm.

14. A method of generating a signal parameter map of an area, the method comprising:
   providing an entity moving within the area;
   performing at least one iteration of a method of tracking an entity by monitoring at least one parameter of a signal, the signal tending to vary spatially and be generally time-invariant, the entity moving from a first location within an area to a second location within the area, the method being suitable for use when the location of the source of the signal is unknown, the method of tracking an entity comprising:

providing a plurality of particles for use with a particle filter, each particle being associated with a respective first particle location, each respective first particle location being an estimate of the first location of the entity;

providing an estimate of the motion of the entity between the first location and the second location based on signals from a motion measurement device;

using the estimate of the motion and using the particle filter, updating each particle thereby producing an updated respective particle location, each updated respective particle location being an estimate of the second location of the entity;

for each updated particle, estimating at least one expected signal parameter at the updated respective particle location;

measuring a signal parameter at the second location of the entity;

assigning a weight to each updated particle depending on the expected signal parameter estimated for that particle and the measured signal parameter;

estimating the second location of the entity by determining a function of the weighted updated particles; and inputting the estimated location and measured signal parameter, as a location/parameter data set, to a database, and thereby producing at least one measured signal parameter and an estimated location of the entity corresponding to each of the at least one measured radio signal strength; and using the each measured signal parameter and each corresponding estimated location of the entity, determining a signal parameter map of the area.

15. A method of determining an estimation of a location within an area of a further entity, the method comprising:

measuring a signal parameter at the location of the further entity; and using a signal parameter map of the area and the measured signal parameter at the location of the further entity, estimating the location within the area of the further entity; wherein the signal parameter map of the area is generated using a method of generating a signal parameter map of an area, the method of generating a signal parameter map of an area comprising:

providing an entity moving within the area;

performing at least one iteration of a method of tracking an entity by monitoring at least one parameter of a signal, the signal tending to vary spatially and be generally time-invariant, the entity moving from a first location within an area to a second location within the area, the method being suitable for use when the location of the source of the signal is unknown, the method of tracking an entity comprising:

providing a plurality of particles for use with a particle filter, each particle being associated with a respective first particle location, each respective first particle location being an estimate of the first location of the entity;

providing an estimate of the motion of the entity between the first location and the second location based on signals from a motion measurement device;

using the estimate of the motion and using the particle filter, updating each particle thereby producing an updated respective particle location, the updated respective particle location being an estimate of the second location of the entity;

for each updated particle, estimating at least one expected signal parameter at the updated respective particle location;

measuring a signal parameter at the second location of the entity;

assigning a weight to each updated particle depending on the expected signal parameter estimated for that particle and the measured signal parameter;

estimating the second location of the entity by determining a function of the weighted updated particles; and inputting the estimated location and measured signal parameter, as a location/parameter data set, to a database, and thereby producing at least one measured signal parameter and an estimated location of the entity corresponding to each of the at least one measured radio signal strength; and using the each measured signal parameter and each corresponding estimated location of the entity, determining a signal parameter map of the area.

16. Apparatus for tracking an entity, the entity moving from a previous location within an area to a current location within the area, the apparatus comprising:

a motion estimation unit;

a particle filter;

a radio scanner;

a magnetometer device; and one or more processors; wherein the motion estimation unit is arranged to provide an estimate of the motion of the entity between the previous location and the current location based on signals from a motion measurement device;

the particle filter comprises a plurality of particles wherein, each particle is associated to a respective particle location;

the particle filter is arranged to, using the estimate of the motion, update each particle from a previous particle location to an updated particle location;

each previous particle location is an estimate of the previous location of the entity;

each updated particle location is an estimate of the current location of the entity;

the radio scanner is arranged to measure a radio signal strength at the current location of the entity;

the magnetometer device is arranged to measure a magnetic field parameter at the current location of the entity; and the one or more processors are arranged to:

for each updated particle, estimate an expected radio signal strength at the updated particle location, and estimate an expected magnetic field parameter at the updated particle location;

assign a weight to each updated particle depending on the expected radio signal strength estimated for that particle and the measured radio signal strength, and depending on the expected magnetic field parameter estimated for that particle and the measured magnetic field parameter;

and estimate the current location of the entity by determining a function of the weighted updated particles.

* * * * *